United States Patent [19]

Martin

[11] 3,725,879

[45] Apr. 3, 1973

[54] FUNCTIONAL MEMORY CELL

[75] Inventor: David H. Martin, Canterbury, England

[73] Assignee: International Business Machines Corporation, Armonk, N.Y.

[22] Filed: Nov. 16, 1970

[21] Appl. No.: 89,791

[52] U.S. Cl.........340/173 AM, 340/173 FF, 307/238

[51] Int. Cl...............................................G11c 11/40

[58] Field of Search..340/173 AM, 173 FF; 307/238, 307/279

[56] References Cited

UNITED STATES PATENTS

| | | | |
|---|---|---|---|
| 3,609,710 | 9/1971 | Browne | 340/173 AM |
| 3,390,382 | 6/1968 | Igarashi | 340/173 FF |
| 3,575,617 | 4/1971 | Burns | 340/173 AM |

OTHER PUBLICATIONS

IBM Technical Disclosure Bulletin, "Low Power Associative Function" by Spampinato et al., Vol. 13, No. 2, 7/70 pages 300–301.

*Primary Examiner*—Stanley M. Urynowicz, Jr.
*Attorney*—Hanifin & Jancin and Martin G. Reiffin

[57] ABSTRACT

A functional memory cell circuit is provided with a sense line and a drive line for each word, and a pair of search lines for each digit. A plurality of binary cells are arranged in arrays. Circuitry is provided for causing current to flow in the word sense lines in response to mismatches between the signal states of the digit search lines as compared with the respective signal states of the binary cells. The amplitudes of the search currents in the word sense lines are relatively constant irrespective of the number of mismatches in each word.

10 Claims, 4 Drawing Figures

INVENTOR
DAVID H. MARTIN

BY Martin G. Reiffin

ATTORNEY

FUNCTIONAL MEMORY CELL

FIELD OF THE INVENTION

The present invention relates to functional memory circuitry which is addressed as an associative store. That is, the store is addressed by the content rather than by the physical location of the stored information. An associative store performs a parallel search of all its stored data to detect all words matching the description of the search argument, and all internal comparisons are carried out simultaneously, providing for significant time saving. When a match is discovered, the information in the associated locations is read out or changed. Thus, all information held in the store is accessible without regard to the location in which it is stored.

The functional memory circuitry uses three-state storage cells. The third state is a "don't care" or "no comment" state. Information in the form of a single look-up table can be used to perform various logic functions. The particular function required to operate on the input data is specified in the input search argument. The memory is thus "functional" in that it can recognize part of its input as function and part as data. The output is the result of applying the required function to the input data. The function performed by the store can be modified by changing the stored data, thereby providing a processing unit in which the functions performed by the physical elements of the system depend only on the stored information and not on any circuit interconnections.

During a search operation, the elementary logic function of each cell is to compare its stored state with the two digit lines, and to produce a mismatch signal on the word sense line if the input coded on the two digit lines and the stored state do not match. Every word in the array is compared simultaneously with the input, and selectors are set for all words in which the stored pattern matches the input pattern in every digit position being compared.

DESCRIPTION OF THE PRIOR ART

In the prior art the definition of the magnitude of the word sense line current was performed in the digit search/read line rather than the word drive line. If only one mismatch occurred then only 1 unit of current appeared in the word sense line. If 12 mismatches occurred then 12 times the current appeared in the word sense line. When tolerance is included the ratio of maximum to minimum current is typically about 25 to 1. This requires that the minimum current be made small which in turn makes the design of a sense amplifier more difficult. At the same time the extra units of mismatch current perform no function and increase the power dissipation.

In the present invention this difficulty is obviated by defining the search current in the word drive line. Since the word sense line current is now independent of the number of mismatches occurring, the ratio of maximum to minimum current is now only about two to one. This allows a larger minimum current thereby making it easier to design the sense amplifier, and also provides a lower maximum search current thereby providing low power dissipation. Higher searching speeds also result from this arrangement.

SUMMARY OF THE INVENTION

It is therefore a primary object of the present invention to provide a functional memory cell circuit wherein the search current in the word sense line is relatively constant irrespective of the number of mismatches in the word, A further object is to provide a functional memory circuit arrangement wherein the minimum search current in the word sense line is relatively high so as to permit easy design of the sense amplifier.

Still another object of the present invention is to provide a functional memory cell having a relatively low maximum search current in the word sense line thereby providing low power dissipation.

Other objects and advantages of the present invention are either inherent in the structure disclosed or will become obvious to those skilled in the art as the detailed description proceeds in connection with the accompanying drawings.

DESCRIPTION OF THE PREFERRED EMBODIMENT

Figure 1:
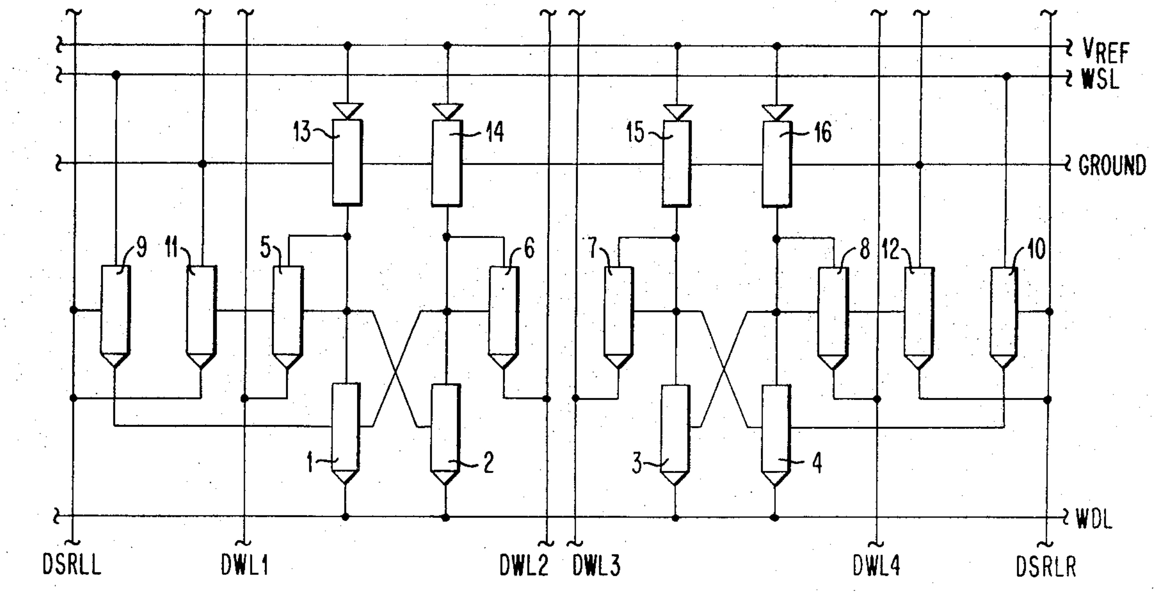
FIG. 1 is a diagram showing the circuitry for a single cell.

Referring first to FIG. 1, transistors 1 and 2 constitute the binary for the left half of the cell and transistors 3 and 4 constitute the binary for the right half of the cell. The collector of transistor 1 is connected to the base of transistor 2 and the collector of transistor 2 is connected to the base of transistor 1. Transistors 3 and 4 are cross-coupled in a similar manner.

The PNP transistor 13 constitutes a current source for the collector of transistor 1 and the PNP transistor 14 provides the same function for the collector of transistor 2. A transistor 5, connected as a diode, extends from the collector of transistor 1 to a digit write line DWL1. Similarly, a transistor 6, connected as a diode, extends from the collector of transistor 2 to a digit write line DWL2. The bases of transistors 13,14 are connected to the ground line. The collector of transistor 11 is also connected to ground and has its emitter connected to a digit search read line DSRLL. The base of transistor 11 is connected to the collector of transistor 1. A transistor 9 has its collector connected to the word sense line WSL and its base connected to the digit search read line DSRLL. The emitter of transistor 9 is connected to the base of transistor 1.

The right half of the cell is a mirror image of the left half and comprises said transistors 3,4 corresponding to transistors 1,2; transistors 7,8 corresponding to transistors 5,6; transistors 15,16 corresponding to transistors 13,14; transistor 12 corresponding to transistor 11. The emitter of transistor 12 is connected to the digit search read line DSRLR to which is also connected the base of transistor 10. The collector of transistor 10 is connected to the word sense line WSL. The emitter of diode-connected transistor 7 is connected to the digit write line DWL3 and the emitter of diode-connected transistor 8 is similarly connected to the digit write line DWL4. The two binaries comprising transistors 1, 2 and 3, 4 enable each cell to assume any one of three different states; a "don't care" or "no comment" state; a binary "1" state; and a binary "0" state. For the "don't care" state, transistor 1 is conductive, transistor 2 is non-conductive, transistor 3 is non-conductive, and transistor 4 is conductive. For the binary "1" state, transistor 1 is conductive, transistor 2 is non-conductive, transistor 3 is conductive, and transistor 4 is non-conductive. For the binary "0" state, transistor 1 is non-conductive, transistor 2 is conductive, transistor 3 is non-conductive, and transistor 4 is conductive.

THE WRITE OPERATION

Transistors 1,2,13,14 form a conventional bistable circuit which has one stable condition with transistor 1 on and transistor 2 off and another stable condition with transistor 1 off and transistor 2 on. The state of the bistable may be changed during a write operation by holding the emitter voltage of transistors 1 and 2 at one potential and pulling down one of their two bases using a writing diode 5 or 6 and a digit write line DWL1 or DWL2. Lowering the voltage on digit write line DWL1 below that of word drive line WDL will cause transistor 2 to be turned off. The collector voltage of transistor 2 will then rise until transistor 1 conducts at which time the bistable state has changed. By lowering digit write line DWL2 instead, transistor 1 can be turned off and transistor 2 can be turned on. Digit write lines DWL3 and DWL4 perform the same function for transistors 3 and 4 in the right half of the cell. If the level of word drive line WDL is below that of either digit write line DWL1 or DWL2 then the state of the bistable will be unchanged. In this way words can be selected by raising their respective word drive lines and only those which are selected will be modified during the write operation.

THE READ OPERATION

Figure 4:
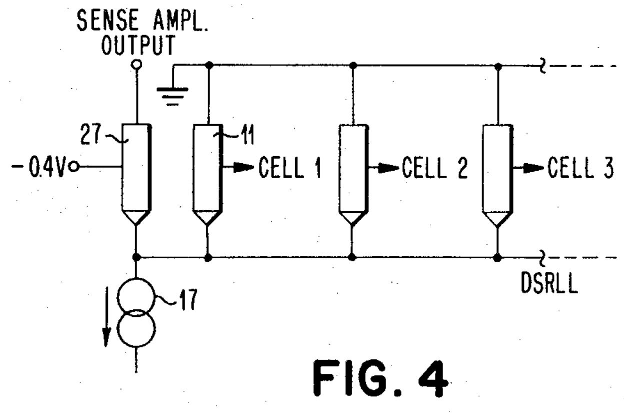
FIG. 4 shows schematically the structure involved in the read operation.

Transistors 11 and 12 are utilized to read data from the cells onto the digit search read lines DSRLL and DSRLR. As shown in FIG. 4, each digit search/read line is connected to a current source 17 and a transistor 27 to form a circuit similar to a multiple input current switch logic block. The base of transistor 27 is connected to a reference potential of −0.4 volts. If the base of transistor 11 or that of transistor 12 is raised above −0.4 volts the current will be diverted from transistor 27 into the device 11 or 12. Only when all the bases are below −0.4 volts will the current flow in transistor 27. In this way the OR function of all the cell states is detected. Only those devices 11, 12 connected to cells of a word having its word drive line WDL at −0.75 volts will read out. This potential is the upper potential level of word drive line WDL for the selected word to be read out. When the potential of word drive line WDL is at this upper level of −0.75 volts, then the potential of the collector of transistor T1 is one diode drop above −0.75 volts or at approximately 0 volts. Therefore, the potential at the base of transistor 11 will be at 0 volts which is above the potential of the digit search read line DSRLL which is at −1.1 volts. Therefore, transistor 11 is conductive and can read out onto digit search read line DSRLL. However, when word drive line WDL is at its lower potential level of −1.4 volts, then the potential at the collector of transistor 1 and base of transistor 11 is one diode drop above −1.4 volts or at −0.7 volts. The latter is not sufficiently higher than the potential of the digit search read line DSRLL which is at −1.1 volts. Therefore, transistor 11 is non-conductive and there is no read out onto digit search read line DSRLL.

THE SEARCH OPERATION

Figure 3:
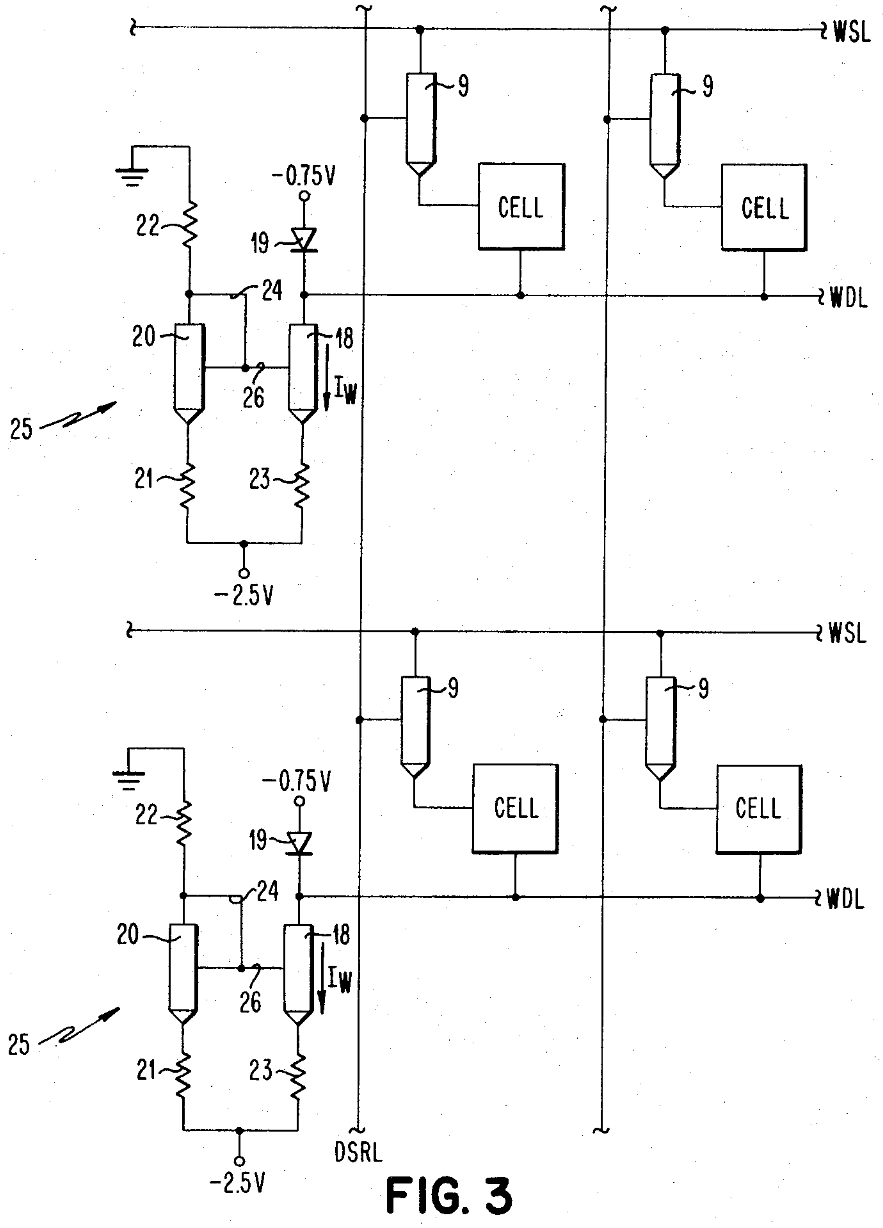
FIG. 3 shows schematically the structure involved in the search operation in accordance with the present invention.

As shown in FIG. 3, each word drive line WDL is connected to a constant current source indicated generally at 25 and comprising transistor 18 having its emitter connected through resistor 23 to a voltage supply at −2.5 volts. The collector of transistor 18 is connected to diode 19 in turn connected to a reference voltage of −0.75 volts. A transistor 20 has its emitter connected through resistor 21 to the voltage supply at −2.5 volts. Transistor 20 is connected as a diode with its base shorted to the collector by lead 24 and the collector in turn connected through resistor 22 to ground. The collector and base of transistor 20 are connected by lead 26 to the base of transistor 18.

Each bistable half-cell functions like a switchable voltage source located between the emitter of a search transistor 9 or 10 and the word drive line WDL. The magnitude of this voltage source is dependent on the state of that particular bistable. For example, if transistor 1 is on and transistor 2 is off then the voltage of the binary is approximately 0.7 volts. Measured from the emitter of a transistor 9 or 10 and its associated word drive line WDL. If transistor 1 is off and transistor 2 is on, the voltage is approximately 0 volts.

There is thus provided a circuit similar to a multiple input current switch logic block. Those transistors 9 or 10 connected to a bistable with 0.7 volts offset voltage have their emitters effectively disconnected from word drive line WDL, whereas those transistors with 0 volts offset have their emitters effectively connected to word drive line WDL. If the base voltage of any of the connected transistors is raised above −0.75 volts by the associated digit search read line DSRLL or DSRLR the current in the constant current source 25 will be diverted from diode 19 to the connected transistor and hence to the word sense line. Any such current is termed a mismatch current.

If any digit search read line is above −0.75 volts and the corresponding bistable is simultaneously in the 0 volt condition this mismatch current will be generated. Thus, for example, if transistors 1 and 3 are off and digit search read line DSRLL is positive, or transistor 1 and 3 are on and the digit search read line DSRLR is positive, a mismatch current flows. If both lines are down or if transistors 1 and 4 are on, no mismatch is found. By this arrangement the current in the word sense line for a mismatch is determined by the value of the current Iw in the constant current source.

Since the PNP current sources 13,14, and 15,16 define a current which also flows in the word drive line it will be seen that Iw must remain equal to the sum of these currents and the required mismatch current. If more than one mismatch occurs in a given word the search current Iw-Ipnp is shared between the search transistors 9,10 but the total word sense line current remains the same.

Figure 2:
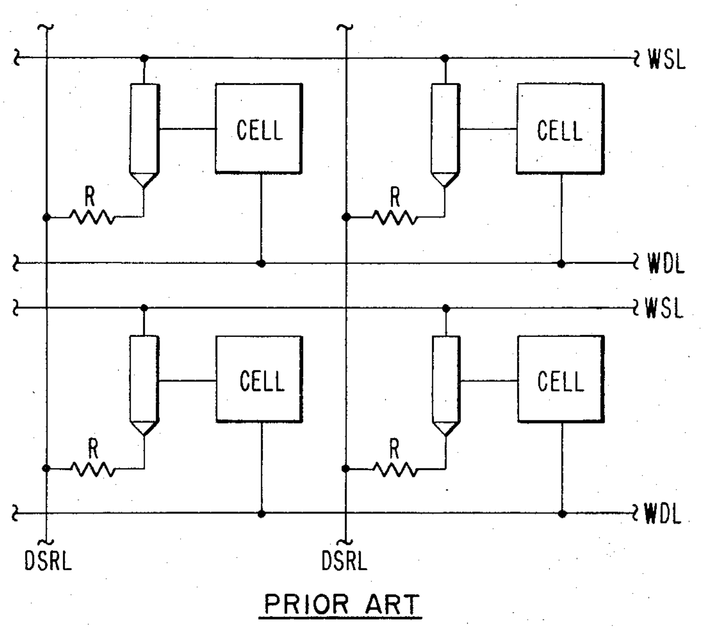
PRIOR ART FIG. 2
FIG. 2 shows schematically the structure involved in the search operation in accordance with the prior art.

This arrangement overcomes the problem of the prior art wherein the search current is proportional to the number of mismatches in the word as shown in FIG. 2. In this prior art arrangement each of the resistors R is used to define a current which flows when the digit search/read line connected to it is negative at the same time as the cell connection associated with it is positive. If only one mismatch occurs then only one unit of current appears in the word sense line WSL. If 12 mismatches occur simultaneously, the 12 times this current appears in the word sense line WSL. When the usual tolerance is taken into account the ratio of maximum to minimum mismatch current in this prior art arrangement is typically about 25 to 1. This requires that the minimum current must be made small which makes the design of a sense amplifier extremely difficult. At the same time the potentially large amplitude of mismatch current serves merely to increase the power dissipation.

As distinguished from this prior art arrangement, in the present invention the search current is defined in the word drive line WDL. Since the word sense line current is now independent of the number of mismatches occurring, the ratio of maximum to minimum current is now only about 2 to 1 which allows a larger minimum current. This results in simpler sense amplifier design, higher speed and reduced power dissipation.

It is to be understood that the specific embodiment disclosed herein is merely illustrative of one of the many forms which the invention may take in practice and that numerous modifications thereof will readily occur to those skilled in the art without departing from the scope of the invention as delineated in the appended claims which are to be construed as broadly as permitted by the prior art.

I claim:

1. In an associative memory including an array of memory cells arranged in rows and columns, p1 each memory cell including a pair of transistors each having a first output electrode, a second output electrode and a control electrode, means cross-coupling the first output electrode of each transistor to the control electrode of the other transistor whereby each pair of transistors constitutes a bistable circuit, a plurality of word drive lines each connected to the second output electrodes of the transistors of the memory cells of a respective row, a plurality of word sense lines each associated with a respective row of memory cells, each memory cell further comprising a third transistor having a first output electrode connected to the respective word sense line and a second output electrode connected to said first output electrode of one of the pair of transistors of the respective memory cell, a plurality of digit search lines each associated with a respective column of memory cells, and each of said third transistors having a control electrode connected to the respective digit search line of the column, the improvement comprising:

a plurality of constant current sources each connected to a respective one of said word drive lines, whereby when said digit search lines and said first output electrodes of one or more cells of one or more rows are at respective predetermined voltage levels, a predetermined current flows from each respective current source through the respective word drive line and through said one or more cells and through the respective third transistors and through the respective sense line associated with each of said one or more rows, and whereby the resulting current in each of said respective word sense lines is substantially constant independently of the number of cells of the row through which current flows.

2. An associative memory as set forth in claim 1 wherein each of said transistors is a bipolar transistor having a collector connected to said first output electrode thereof, an emitter connected to said second output electrode thereof, and a base connected to said control electrode thereof.

3. An associative memory as set forth in claim 1 wherein each of said constant current sources comprises a fourth transistor having a first output electrode, a second output electrode, and a control electrode, a first voltage source and a second voltage source, means biasing said fourth transistor control electrode, and a diode having one end connected to said first voltage source, said first output electrode of said fourth transistor being connected to the other end of said diode and to the respective word drive line, said second output electrode of said fourth transistor being connected to said second voltage source,

4. An associative memory as set forth in claim 3 wherein each of said transistors is a bipolar transistor having a collector connected to said first output electrode thereof, an emitter connected to said second output electrode thereof, and a base connected to said control electrode thereof.

5. An associative memory as set forth in claim 1 wherein each of said constant current sources comprises a fourth transistor having an output electrode connected to the respective word drive line, a voltage source, and nonlinear circuit means extending from said voltage source to said word drive line and said fourth transistor output electrode.

6. An associative memory as set forth in claim 5 wherein said nonlinear circuit means comprises means conductive for a first predetermined voltage range of said fourth transistor output electrode and nonconductive for a second predetermined voltage range of said fourth transistor output electrode.

7. An associative memory as set forth in claim 5 wherein said nonlinear circuit means comprises a diode.

8. An associative memory as set forth in claim 5 wherein each of said pair of transistors and said third transistor is a bipolar transistor having a collector connected to said first output electrode, an emitter connected to said second output electrode, and a base connected to said control electrode, and each of said fourth transistors is a bipolar transistor having a collector connected to said output electrode thereof.

9. In an associative memory including an array of memory cells arranged in rows and columns, each memory cell having an output node and an input node, a plurality of word drive lines each connected to the input nodes of a respective row of cells, a plurality of word sense lines each associated with a respective row of cells, a plurality of active devices each associated with a respective cell and each active device having a first output electrode connected to the respective word sense line and a second output electrode connected to said output node of the respective cell, a plurality of digit search lines each associated with a respective column of cells, and each of said active devices having a control electrode connected to the respective digit search line, the improvement comprising:

a plurality of constant current sources each connected to a respective one of said word drive lines, whereby when said digit search lines and said cell output nodes are at predetermined voltage levels indicating a mismatch of the information stored in one or more of said cells and the information on said digit search lines, a predetermined current flows from the respective current source of each row of cells containing a mismatch cell, said predetermined current flowing through said respective word drive line, said mismatch cells, the respective active devices and the respective word sense line, and whereby the resulting current in each of said word sense lines associated with a row having one or more mismatch cells is substantially constant and independent of the number of mismatch cells of the row.

10. An associative memory as set forth in claim 9 wherein each of said constant current sources comprises a second active device having a first output electrode and a second output electrode, a first voltage source and a second voltage source, and a nonlinear device having one end connected to said first voltage source and another end connected to said first output electrode of said second active device, said first output electrode of said second active device being connected to the respective word drive line, said second output electrode of said second active device being connected to said second voltage source.

* * * * *